(12) United States Patent
Worsham

(10) Patent No.: US 11,594,864 B1
(45) Date of Patent: Feb. 28, 2023

(54) FLAT SURFACE MOUNTABLE ENCLOSURE ADAPTER FOR A PANEL MOUNTED CIRCUIT BREAKER

(71) Applicant: David Worsham, Santa Rosa Beach, FL (US)

(72) Inventor: David Worsham, Santa Rosa Beach, FL (US)

(*) Notice: Subject to any disclaimer, the term of this patent is extended or adjusted under 35 U.S.C. 154(b) by 62 days.

(21) Appl. No.: 17/471,210

(22) Filed: Sep. 10, 2021

(51) Int. Cl.
*H01H 9/04* (2006.01)
*H02B 1/48* (2006.01)

(52) U.S. Cl.
CPC .............. *H02B 1/48* (2013.01); *H01H 9/04* (2013.01)

(58) Field of Classification Search
CPC ..................................... H02B 1/48; H01H 9/04
See application file for complete search history.

(56) References Cited

U.S. PATENT DOCUMENTS

| | | | |
|---|---|---|---|
| 5,243,157 A * | 9/1993 | Hoffman | H01H 9/281 200/43.11 |
| 6,490,150 B1 * | 12/2002 | Theisen | H01H 9/12 361/652 |
| 6,744,345 B2 * | 6/2004 | Korczynski | H01H 81/02 337/72 |
| 10,957,497 B2 * | 3/2021 | Drechsler | B65D 7/12 |

* cited by examiner

*Primary Examiner* — Robert J Hoffberg
(74) *Attorney, Agent, or Firm* — Lanier Ford Shaver & Payne, P.C.; Gerald M. Walsh

(57) ABSTRACT

An enclosure adapter for a circuit breaker that converts a panel mounted circuit breaker to a flat surface mounted circuit breaker. The enclosure adapter has a housing with a top end, an open bottom end, and sides defining an interior. The open bottom end allows for insertion of a circuit breaker into the interior. The top end has an opening to provide access to controls on the circuit breaker and has openings for attaching the circuit breaker to an interior side of the top end. Mounting members are formed at the bottom end of the enclosure adapter to mount the enclosure adapter to a flat surface. The sides form corners which are indentations into the interior of the enclosure adapter and the mounting members are formed in the indentations, wherein the indentations facilitate mounting the enclosure adapter to a flat surface. Removable tabs create openings for electrical connections.

10 Claims, 5 Drawing Sheets

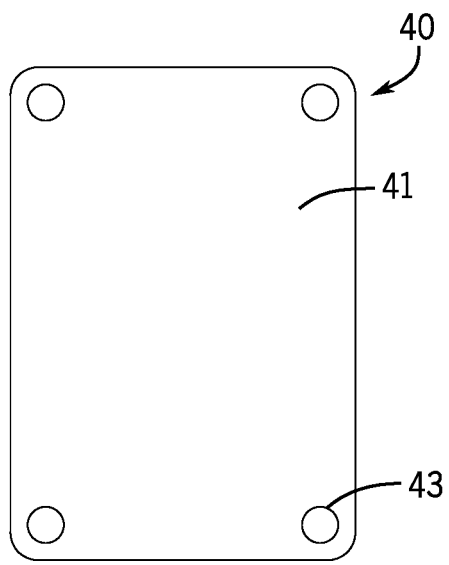
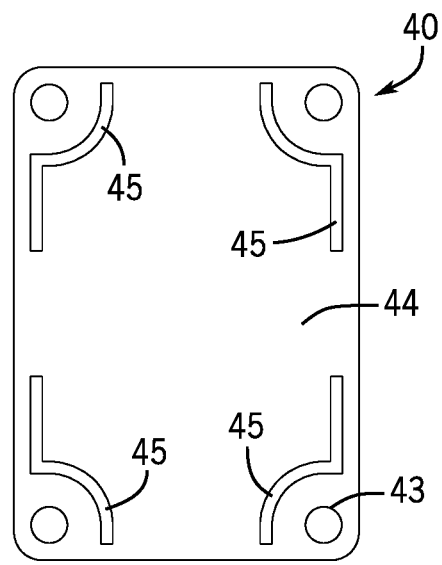
FIG. 7  FIG. 8
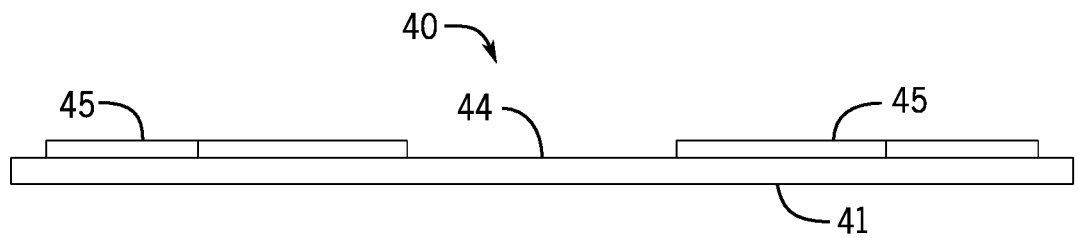
FIG. 9
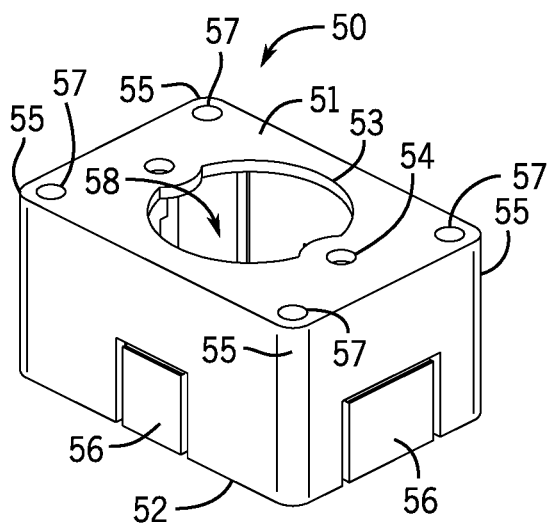
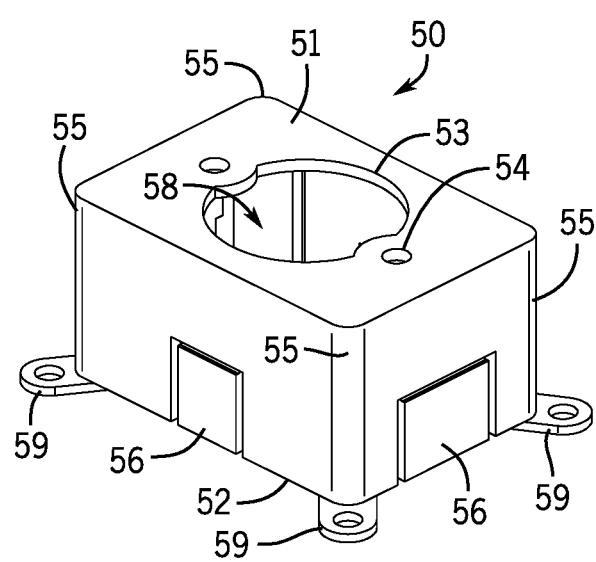
FIG. 10  FIG. 11

FLAT SURFACE MOUNTABLE ENCLOSURE ADAPTER FOR A PANEL MOUNTED CIRCUIT BREAKER

FIELD OF THE INVENTION

This invention relates generally to enclosures for circuit breakers and, more particularly, to flat surface mountable enclosures for mid-range circuit breakers that are designed only for panel mounting.

BACKGROUND OF THE INVENTION

Circuit breakers are a type of switch designed to disrupt electrical current when an overload or short occurs. The circuit breakers can be used in a variety of electrical applications requiring circuit protection. Most DC circuit breaker options are thermally controlled, meaning during an over current condition, the additional current will cause excess heat to build up in the circuit breaker. With this excess heat, the breaker will trip, making it an essential safety component providing thermal overload protection to diverse applications. Mid-range circuit breakers cover a range of amperage from 10 to 60 amps. They are used in DC power systems in marine applications as a main or branch circuit breaker and also in truck, bus, and RV systems or as an add-on protection for accessories.

Most mid-range circuit breakers are constructed for panel mounting which limits their use to systems that have electrical panels. In many cases, it is desirable to surface mount a mid-range circuit breaker, particularly in boats. What is needed is an adapter to adapt panel mounted mid-range circuit breakers for surface mounting.

SUMMARY OF THE INVENTION

The present invention is an enclosure adapter for a circuit breaker, particularly a circuit breaker that is designed only for panel mounting. The enclosure adapter has a housing with a top end, a bottom end, and sides which define an interior of the enclosure adapter. The bottom end is open for insertion of the circuit breaker. The top end has an opening to provide access to controls on the circuit breaker and has one or more openings for attaching the circuit breaker to an interior side of the top end. The enclosure adapter has one or more mounting members with mounting holes formed at the bottom end of the enclosure adapter. The mounting members are constructed to mount the enclosure adapter to a flat surface. The circuit breaker that is designed only for panel mounting is thereby adapted for a flat surface mounting.

The sides form corners which are indentations into the interior of the enclosure adapter and the mounting members are formed in the indentations near the bottom end of the housing. The indentations facilitate mounting the enclosure adapter to a flat surface and allow the use of short length screws or bolts. One or more removable tabs are located in the sides near the bottom end of the enclosure adapter. Removing a tab creates an opening that allows electrical wires to extend into or out of the interior of the enclosure adapter.

The enclosure adapter has a bottom cover to cover the open bottom end. The bottom cover has one or more mounting holes and an interior surface having one or more centering ridges. The centering ridges center the bottom cover over the open bottom end so that the mounting holes of the bottom cover are aligned with the mounting holes of the mounting members of the enclosure adapter.

The enclosure adapter can have a circuit breaker that is designed only for panel mounting inserted into the interior and attached to an interior side of the top end. The circuit breaker is contained completely within the interior of the enclosure adapter and is thereby adapted by the enclosure adapter for flat surface mounting.

An advantage of the present invention is an enclosure for a panel mounted circuit breaker, such as a mid-range circuit breaker, that adapts the panel mounted circuit breaker for a flat surface mounting such as on a wall, floor, or ceiling.

Another advantage is an enclosure adapter for a circuit breaker that can isolate and insulate the circuit breaker.

Another advantage is an inexpensive, easy-to-use device that converts a panel mounted circuit breaker to a flat surface mounted circuit breaker.

BRIEF DESCRIPTION OF THE DRAWINGS

FIG. 7 shows an outside surface of a cover for an open bottom end of the enclosure adapter.

FIG. 8 shows an interior surface of the cover.

FIG. 9 is a side view of the cover.

FIG. 10 is a top, front, perspective view of an alternant embodiment of the enclosure adapter, having mounting holes for a flat surface on the top end.

FIG. 11 is a top, front, perspective view of a variation of the enclosure adapter of FIG. 10, having mounting members for a flat surface extending from the sides at the bottom end.

DETAILED DESCRIPTION OF THE INVENTION

While the following description details the preferred embodiments of the present invention, it is to be understood that the invention is not limited in its application to the details of arrangement of the parts as described and shown in the figures disclosed herein, since the invention is capable of other embodiments and of being practiced in various ways.

Figure 1:
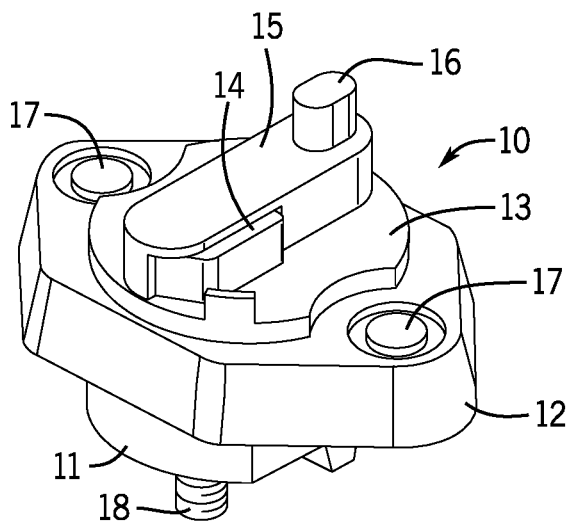
FIG. 1 is a top, front, perspective view of a mid-range circuit breaker of the prior art.

FIG. 1 is a top, front, perspective view of a panel-mounted mid-range circuit breaker 10 of the prior art. Mid-range circuit breaker 10 has a base 11 with a cover 12 having a raised surface 13. A manual reset switch element 14 is positioned on the top of the raised surface 13. The reset switch element 14 is covered with a reset switch guard 15. A trip element 16 projects through the reset switch guard 15. A load terminal 18 extends downward from the base 11. Panel mounting through-holes 17 are positioned at each end of the mid-range circuit breaker 10. In many cases, it may be desirable to mount the circuit breaker 10 onto a flat surface instead of into an electrical panel. The present invention provides an enclosure adapter for a circuit breaker so that the circuit breaker may be mounted onto a flat surface.

Figure 2:
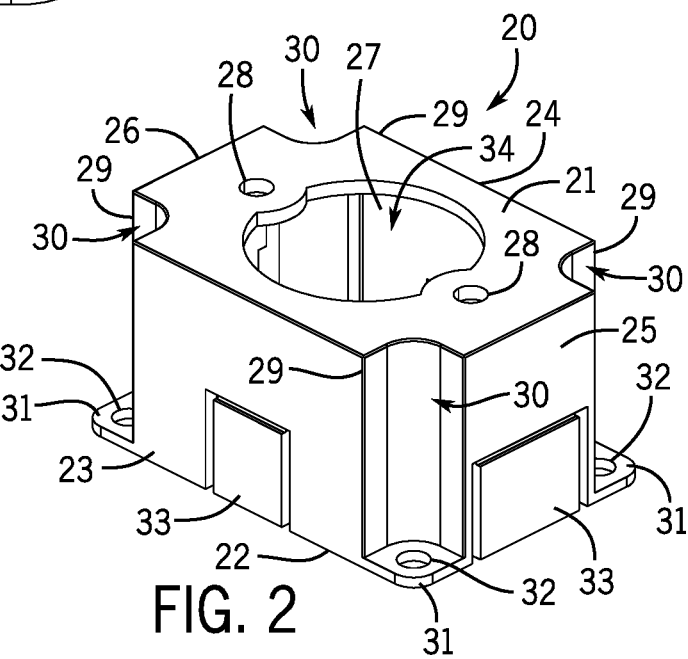
FIG. 2 is a top perspective view of an enclosure adapter of the present invention for a mid-range circuit breaker.

FIG. 2 is a top perspective view of an enclosure adapter 20 of the present invention for a circuit breaker, such as a mid-range circuit breaker 10. The enclosure adapter 20 has a top end 21, an open bottom end 22, a first side 23, a second side 24, a third side 25, and a fourth side 26 forming a housing have an interior 34. The top end 21 has an opening 27 for a user to access circuit breaker controls 14, 15, and 16. The top end 21 also has openings 28 for mounting the circuit breaker to an interior surface of the top end 21 with fasteners such as bolts or screws. The bottom end 21 is open for the insertion of a circuit breaker. The sides 23, 24, 25, and 26, form corners 29 which are configured, preferably, as indentations 30. A mounting member 31 is formed at the bottom of the indentation and has a mounting hole 32 for mounting the enclosure adapter 20 to a flat surface with screws, bolts, and the like. Each side has a removable tab 33 which is reversibly attached to the side and may be removed from the side to create an opening so that electrical wires may be inserted into or out of the interior 34 of the enclosure adapter 20.

The indentations 30 allow easy access of a tool such as a screwdriver or bolt driver to rotate screws or bolts in the mounting holes 32 to fasten the mounting members 31 to a flat surface. The indentations allow the shaft of the screwdriver or bolt driver to be maintained in line with a screw or bolt as the screw or bolt is rotated by the screwdriver or bolt driver. Although the indentations 30 are positioned at the corners 29 they can be positioned anywhere along the sides of the enclosure adapter 20.

Figure 3A:
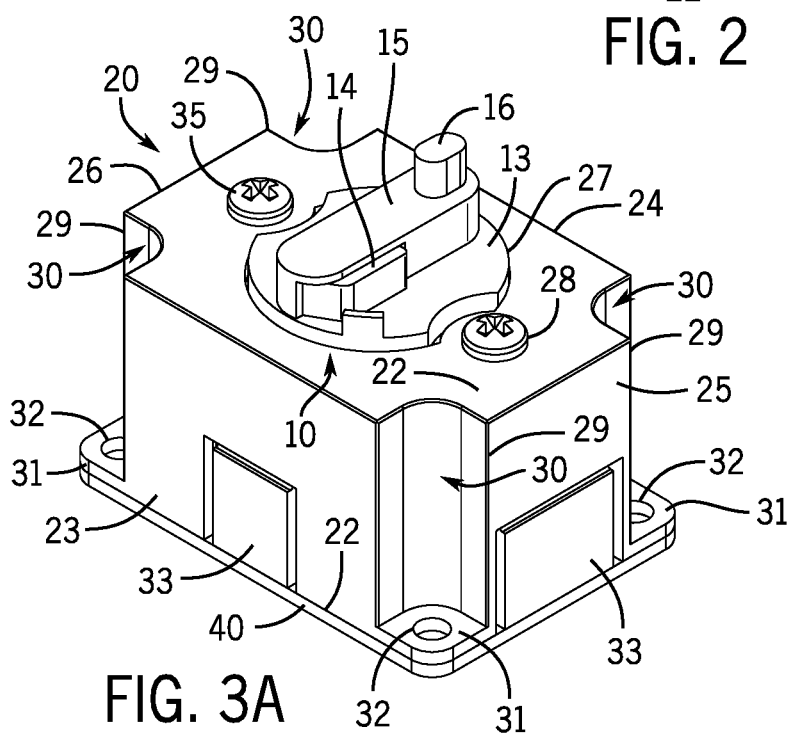
FIG. 3A is a top perspective view of the mid-range circuit breaker mounted in the interior of the enclosure adapter.
Figure 3B:
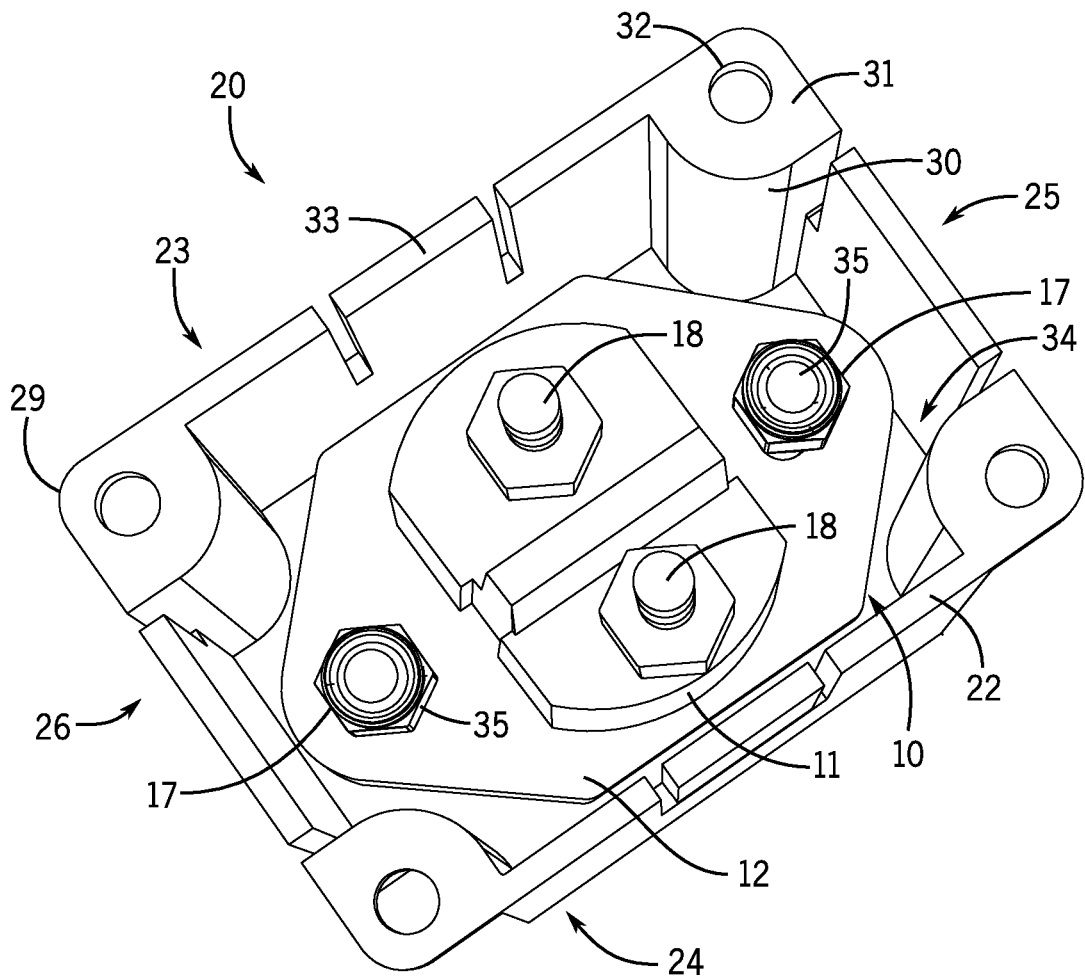
FIG. 3B is a bottom perspective view of the mid-range circuit breaker mounted in the interior of the enclosure adapter.

FIG. 3A is a top perspective view of the mid-range circuit breaker 10 positioned in the interior 34 of the enclosure adapter 20. The raised surface 13 of the mid-range circuit breaker 10 with its controls 14 and 16 extends upward through the opening 27 of the enclosure adapter 20. FIG. 3 shows fasteners 35 attaching the mid-range circuit breaker 10 to an interior surface of the top end 21 of the enclosure adapter 20. FIG. 3A further shows a bottom cover 40 which covers and closes the open bottom end 22 of the enclosure adapter 20. FIG. 3B is a bottom perspective view of the mid-range circuit breaker 10 positioned in the interior 34 of the enclosure adapter 20.

Figure 4:
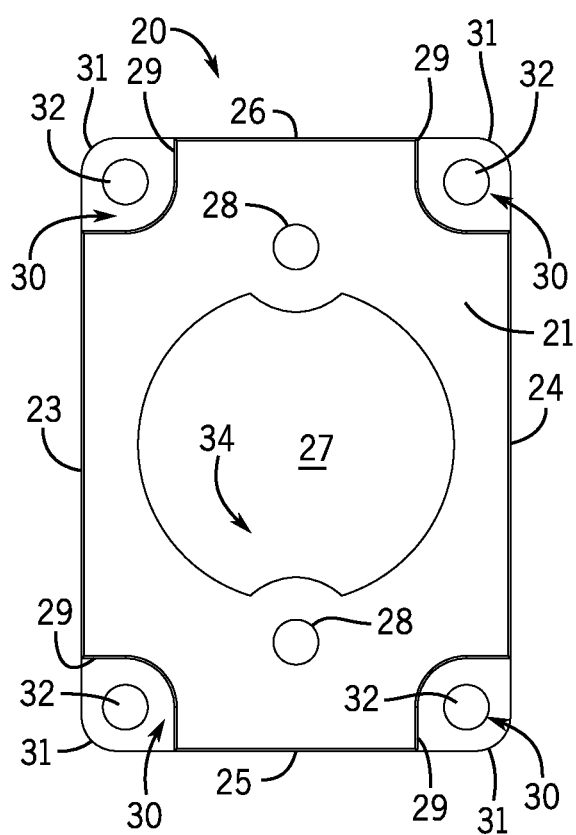
FIG. 4 is a top view of the enclosure adapter.
Figure 5:
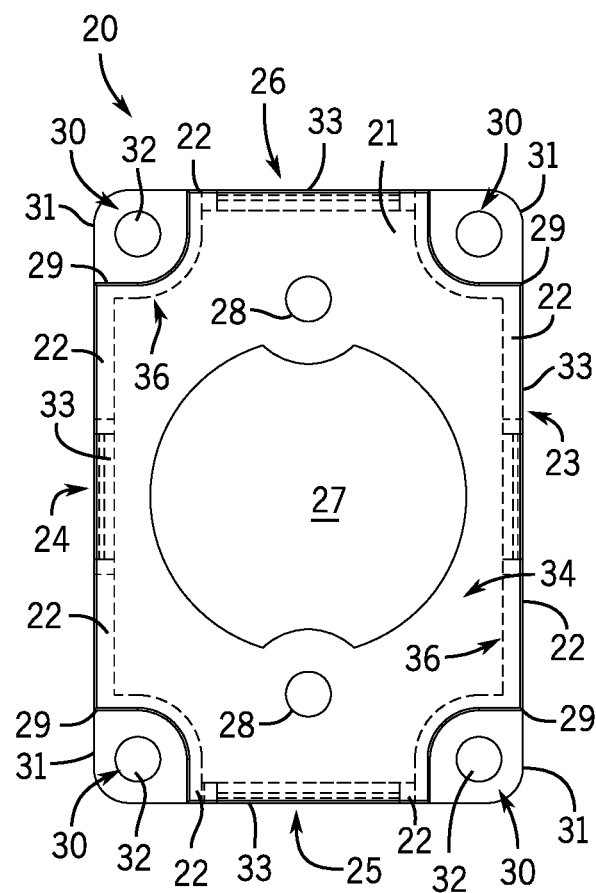
FIG. 5 is a bottom view of the enclosure adapter.
Figure 6:
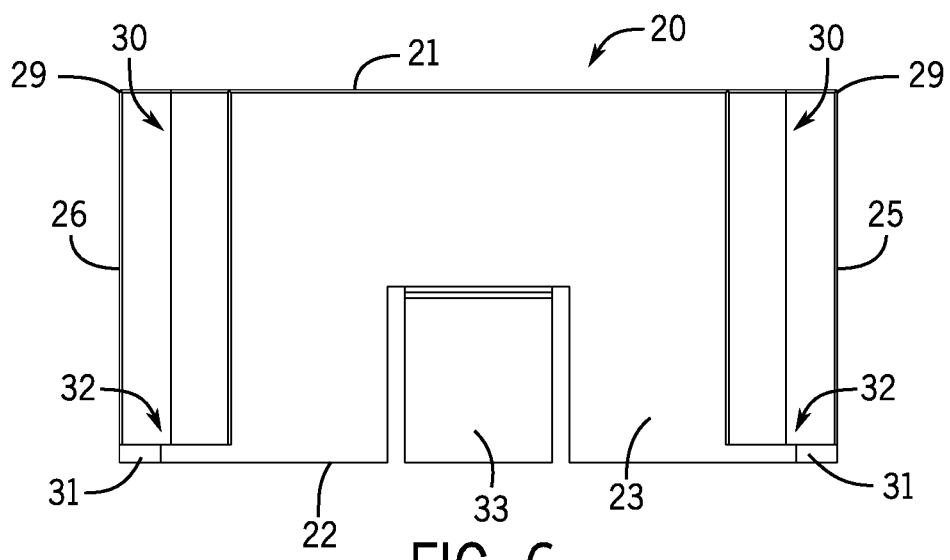
FIG. 6 is a side view of a second side of the enclosure adapter.

FIG. 4 is a top view of the enclosure adapter 20 and FIG. 5 is a bottom view of the enclosure adapter 20. FIG. 5 shows the outline of the open bottom end 22 and the location of the tabs 33. FIG. 6 is a side view of the second side 23 of the enclosure adapter 20.

FIG. 7 shows an outside surface 41 of a cover 40 for the open bottom end 22 of the enclosure adapter 20. Bottom cover 40 has mounting holes 43 for mounting the cover 40 to a flat surface. FIG. 8 shows an interior surface 44 of the cover 40. The interior surface 44 has centering ridges 45 which extend upward in the interior 34 of the enclosure adapter 20, adjacent to interior walls 36 (see FIG. 5) of the enclosure adapter 20. The centering ridges 45 center the bottom cover 40 over the open bottom end 22 so that the mounting holes 43 of the bottom cover 40 align with the mounting openings 32 in the mounting members 31 of the enclosure adapter 20. Preferably, the centering ridges 45 conform to the shape of the interior walls 36 of the enclosure adapter 20 and form a friction fit in the open bottom end 22 of the enclosure adapter 20 so that the cover 40 remains in place while the enclosure adapter and cover are mounted to a flat surface. FIG. 9 is a side view of the cover.

FIG. 10 shows an alternant embodiment 50 of the enclosure adapter 20. The enclosure adapter 50 has a top end 51, a bottom end 52, an opening for circuit breaker controls 53, openings 54 for mounting the mid-range circuit breaker 10 to the top end 51 of the enclosure adapter 50, corners 55, tabs 56, openings 57 on the top end 51 for mounting the enclosure adapter 50 to a flat surface, and an interior 58. Because openings 57 for mounting the enclosure adapter 50 to a flat surface are on the top end 51, the top end 51 is attached with long screws or bolts to the flat surface. FIG. 11 shows a variation of the enclosure adapter 50 of FIG. 10, wherein mounting members 59 for mounting the enclosure adapter 50 to a flat surface extend outward from the bottom end 52.

Figure 12:
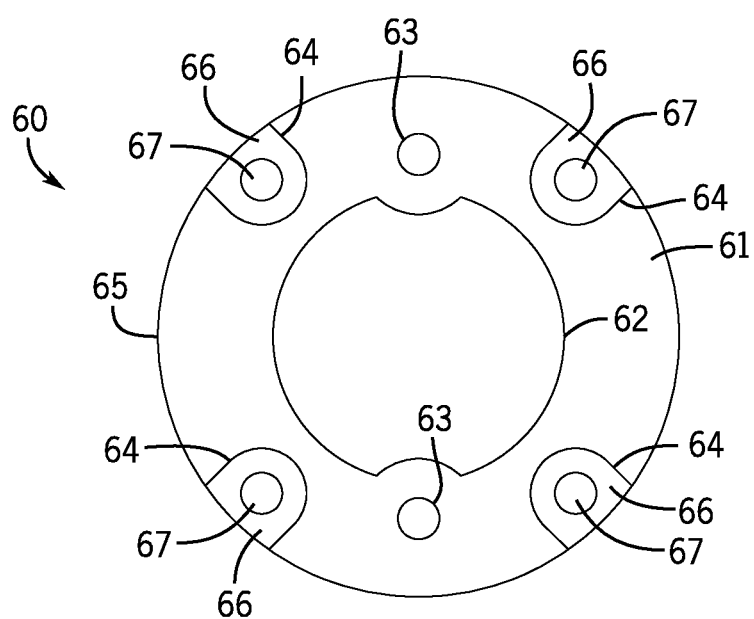
FIG. 12 is a top view of an alternant embodiment of the enclosure adapter, having a circular configuration.

FIG. 12 shows a top view of an alternant embodiment 60 of the enclosure adapter 20. The enclosure adapter 60 has all the features of enclosure adapter 20 except that enclosure adapter 60 is circular. FIG. 12 shows the enclosure adapter 60 having a top end 61, an opening for circuit breaker controls 62, openings 63 for mounting the circuit breaker to the top end 61, indentations 64, sides 65, mounting members 66 with openings 67 for mounting the enclosure adapter 60 to a flat surface.

In use, a circuit breaker that is designed for panel mounting is inserted into the interior of the enclosure adapter. The circuit breaker is oriented so that the raised surface, reset switch, and trip element extend out of the opening for the circuit breaker controls on the top end. The circuit breaker is attached to the interior surface of the top end with fasteners extending through the mounting holes on the top end and extending through the panel mounting through-holes of the circuit breaker. If desired, the bottom cover can be attached to the open bottom end of the enclosure adapter. The circuit breaker that is designed only for panel mounting is now adapted for flat surface mounting.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the opening for circuit breaker controls can have any desired shape. The enclosure adapter can have any desired shape for type of circuit breaker. The enclosure adapter can be made of any suitable plastic or metal.

It will be understood that various changes in the details of the method and materials which have been described and illustrated above in order to explain the nature of this invention may be made by those skilled in the art without departing from the principle and scope of the invention as recited in the following claims.

I claim:
1. An enclosure adapter for a circuit breaker, comprising:
   a) a housing having an interior defined by a top end, a bottom end, and sides;
   b) the bottom end of the housing being open for insertion of the circuit breaker;
   c) the top end of the housing having a first opening configured to allow controls of the circuit breaker to extend out of the housing;
   d) the top end of the housing having one or more second openings for attaching the circuit breaker to an interior side of the top end;
   e) one or more mounting members formed at the bottom end of the housing, the one or more mounting members constructed to mount the housing to a flat surface; and f) the interior of the housing configured for containing the circuit breaker so that the circuit breaker does not extend beyond the flat surface.

2. The enclosure adapter of claim 1, further comprising one or more removable tabs in the sides near the bottom end of the housing, wherein removing the one or more removable tabs creates one or more third openings to allow electrical wires to extend into or out of the interior of the housing.

3. The enclosure adapter of claim 1, wherein the one or more mounting members comprises one or more housing mounting holes, the enclosure adapter further comprising a bottom cover having one or more cover mounting holes and an interior surface, the interior surface having one or more centering ridges, wherein the one or more centering ridges center the bottom cover over the open bottom end of the housing so that the one or more cover mounting holes are aligned with of the one or more housing mounting holes.

4. The enclosure adapter of claim 1, further comprising the circuit breaker inserted into the interior of the housing and attached to the interior side of the top end of the housing, wherein the circuit breaker is contained within the interior of the housing and does not extend beyond the flat surface, and the housing is thereby adapted for mounting to the flat surface.

5. An enclosure adapter for a circuit breaker, comprising:
   a) a housing having an interior defined by a top end, a bottom end, and sides;
   b) the bottom end of the housing being open for insertion of the circuit breaker;
   c) the top end of the housing having a first opening configured to allow controls of the circuit breaker to extend out of the housing;
   d) the top end of the housing having one or more second openings for attaching the circuit breaker to an interior side of the top end;
   e) one or more mounting members formed at the bottom end of the housing, the one or more mounting members constructed to mount the housing to a flat surface;
   f) the sides forming corners which are indentations into the interior of the housing and the one or more mounting members are formed in the indentations near the bottom end of the housing, wherein the indentations facilitate mounting the housing to the flat surface; and
   g) the interior of the housing configured for containing the circuit breaker so that the circuit breaker does not extend beyond the flat surface.

6. The enclosure adapter of claim 5, further comprising one or more removable tabs in the sides near the bottom end of the housing, wherein removing the one or more removable tabs creates one or more third openings to allow electrical wires to extend into or out of the interior of the housing.

7. The enclosure adapter of claim 5, the one or more mounting members comprise one or more housing mounting holes, the enclosure adapter further comprising a bottom cover having one or more cover mounting holes and an interior surface, the interior surface having one or more centering ridges, wherein the one or more centering ridges center the bottom cover over the open bottom end of the housing so that the one or more cover mounting holes are aligned with of the one or more housing mounting holes.

8. The enclosure adapter of claim 6, further comprising the circuit breaker inserted into the interior of the housing and attached to the interior side of the top end of the housing, wherein the circuit breaker is contained within the interior of the housing and does not extend beyond the flat surface, and the housing is thereby adapted for mounting to the flat surface.

9. An enclosure adapter for a circuit breaker, comprising:
   a) a housing having an interior defined by a top end, a bottom end, and sides;
   b) the bottom end of the housing being open for insertion of the circuit breaker;
   c) the top end of the housing having a first opening configured to allow controls of the circuit breaker to extend out of the housing;
   d) the top end of the housing having one or more second openings for attaching the circuit breaker to an interior side of the top end;
   e) one or more mounting members formed at the bottom end of the housing, the one or more mounting members comprise one or more housing mounting holes and constructed to mount the housing to a bottom cover;
   f) the sides of the housing forming corners which are indentations into the interior of the housing and the one or more mounting members are formed in the indentations near the bottom end of the housing, wherein the indentations facilitate mounting the housing to a the bottom cover;
   g) one or more removable tabs in the sides near the bottom end of the enclosure adapter, wherein removing the one or more removable tabs creates one or more third openings to allow electrical wires to extend into or out of the interior of the housing;
   h) the bottom cover having one or more cover mounting holes and an interior surface, the interior surface having one or more centering ridges, wherein the one or more centering ridges center the bottom cover over the open bottom end of the housing so that the one or more cover mounting holes are aligned with of the one or more housing mounting holes; and
   i) the interior of the housing configured for containing the circuit breaker so that the circuit breaker does not extend beyond the interior surface of the bottom cover.

10. The enclosure adapter of claim 9, further comprising the circuit breaker inserted into the interior of the housing and attached to the interior side of the top end of the housing, wherein the circuit breaker is contained within the interior of the housing and does not extend to the interior surface of the bottom cover, and the housing is thereby adapted for mounting to the to the bottom cover.

\* \* \* \* \*